(No Model.)
B. REIN.
VULCANIZER.
No. 604,788. Patented May 31, 1898.
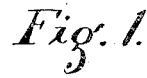
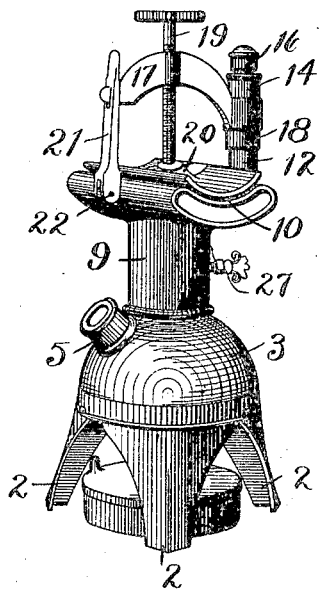
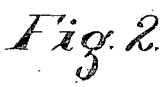
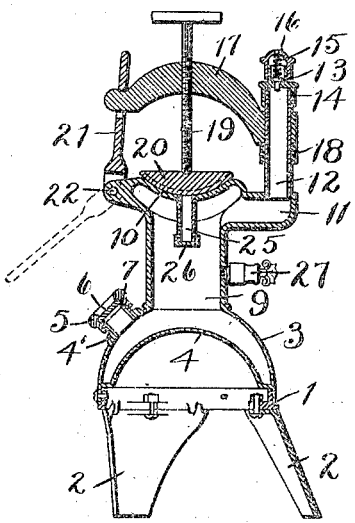
Witnesses.
Inventor.
Bernard Rein
by Church & Church
his Attorneys

UNITED STATES PATENT OFFICE.

BERNARD REIN, OF ROCHESTER, NEW YORK, ASSIGNOR OF ONE-HALF TO THE RED CROSS CEMENT AND RUBBER COMPANY, OF SAME PLACE.

VULCANIZER.

SPECIFICATION forming part of Letters Patent No. 604,788, dated May 31, 1898.

Application filed December 29, 1897. Serial No. 664,313. (No model.)

*To all whom it may concern:*

Be it known that I, BERNARD REIN, of Rochester, in the county of Monroe and State of New York, have invented certain new and useful Improvements in Vulcanizers; and I do hereby declare the following to be a full, clear, and exact description of the same, reference being had to the accompanying drawings, forming a part of this specification, and to the reference-numerals marked thereon.

My present invention has for its object to provide an improved vulcanizer particularly adapted for use in repairing pneumatic bicycle-tires, though capable of use for other purposes, and which shall be simple and cheap in construction and capable of use in ordinary bicycle repair-shops without the requirement of the services of a skilled operator; and to these ends it consists in certain improvements in construction and combinations of parts, all as will be hereinafter fully described, and the novel features pointed out in the claims at the end of this specification.

In the drawings, Figure 1 is a perspective view of a vulcanizer constructed in accordance with my invention, and Fig. 2 a vertical sectional view of the same.

Similar reference-numerals in both the figures indicate similar parts.

In carrying out my invention I provide a suitable base or stand portion, preferably composed of a metal ring 1 and having supporting-legs 2 removably secured thereto, so as to permit the insertion of a spirit or gas burner beneath for heating the boiler. The boiler is preferably composed of an outer sheet-metal shell 3, hemispherical in form, provided with the recessed or hemispherical bottom plate 4, the arrangement not only forming a heat-retaining chamber, but providing an extended surface for heating the water and generating steam in a short space of time. Located at one side of the boiler is a window or gage for enabling the operator to ascertain the water-level, and consisting in the present instance of an inclined threaded nipple 4×, upon which is screwed a shouldered nut 5, adapted to hold a glass disk 6 over the open end of the nipple, suitable packing-gaskets 7 being arranged between the ring and tube, as shown, to make a steam-tight joint.

By means of this sight-aperture, which is directed toward the bottom plate, the operator may readily ascertain whether or not the water-level is above the bottom.

The upper steam chamber or dome of the apparatus (indicated by 9) is constructed, preferably, of cast metal, its lower end being connected to the top of and resting upon the boiler and its upper portion constituting a work-support and being somewhat longer than the lower part and with its surface concaved, as at 10, to approximate the curve of a deflated pneumatic bicycle-tire. This steam-chamber 9 is also formed with a hollow lateral extension 11, communicating with the interior, and upon which is arranged a tubular standard 12, having at its upper end a safety-valve 13, normally closed against a seat in a collar 14, screwed on the standard 12. The valve is normally held closed by a spring 15, operated upon by a perforated cap 16, screwing on the collar 14, whereby the pressure at which the steam blows off may be regulated as desired.

17 indicates an arm preferably loosely sleeved on the standard 12, supported upon a collar 18 thereon, and adapted to be swung across or away from the upper surface of the work-support, said arm having a clamping-screw 19 passing through it and engaging a clamp-block 20, the under surface of which latter is preferably arranged to fit the surface 10 of the dome portion and to firmly clamp the tire to be vulcanized. It is desirable that this arm 17 be capable of swinging over and away from the concaved surface in order that the parts to be vulcanized may be more readily applied, though this capability of movement is not essential; but in any event I prefer to brace the outer end of the arm and prevent its springing by providing a link 21, hinged at 22 to the dome opposite the standard 12 and adapted to be swung over the end of the arm, as shown in full lines, and when the tire is applied to be swung down, as in dotted lines in Fig. 2.

The manner of using the device will now be apparent to those skilled in the art.

The tire to be repaired is properly cleaned and the puncture or rent covered by a piece of unvulcanized and soft rubber and other coverings applied, if desired. Then the arm 17 being preferably swung to one side the tire is placed on the concave surface 10, with the patch in contact therewith, the clamp-block is placed over the tire, the arm swung over it, engaged by the link 21, and the screw 19 moved down, clamping it firmly. The boiler having been previously partially filled with water, the heating-flame is applied to the bottom and the operation proceeded with, the temperature to which the tire is subjected being regulated by the adjustment of the safety or blow-off valve, as will be understood.

For the purpose of enabling valve-tubes to be applied to tires I provide in the center of the dome a downwardly-extending chamber 25 to accommodate the nipple and valve, said chamber being preferably formed by a tube closed at its lower end by means of a cap 26, as shown in Fig. 2.

The apparatus thus constructed is simple, cheap, and admirably adapted to the purpose, and the construction of the dome or steam-chamber 9 of cast metal, while the boiler proper is of sheet metal, enables me at slight expense to hold the tire in contact with a large mass of heated metal and at the same time to have a boiler sufficiently light and strong for all practical purposes. The boiler may be filled with water by removing the gage-glass, if desired; but I prefer to employ a separate water-inlet cock 27 in the side, which may be connected with a water-supply by a hose, if desired.

I claim as my invention—

1. In a vulcanizer, the combination with the base, the sheet-metal boiler 3 supported thereon, the heavier cast-metal closed steam-chamber 9 secured to the upper portion of the boiler and having the shaped upper surface, the standard mounted on the chamber, the arm on the standard, and the shaped clamping-block movable on the arm.

2. In a vulcanizer, the combination with the boiler, and the inclosed steam-chamber, constituting a work-support, of the vertical, hollow standard at one side communicating with the steam-chamber, the valve at the upper end thereof, a laterally-extending clamp-arm supported on the tube and extending over the chamber, and clamping devices thereon.

3. In a vulcanizer, the combination with the base, the boiler and the steam-chamber having the concaved upper surface, and the downwardly-extending recess 25 therein, of the standard at the side of the chamber, the arm 17 mounted thereon, the clamping-screw operating through the arm and the convex block 20 with which the clamping-screw cooperates.

4. In a vulcanizer, the combination with the boiler and the inclosed steam-chamber, the exterior of which constitutes a work-support, of the vertical standard at one side of the work-support, the supporting-arm pivotally mounted on the standard and adapted to swing laterally over or away from the work-support, and clamping devices mounted on said arm.

5. In a vulcanizer, the combination with the boiler, the steam-chamber, the exterior of which constitutes a work-support, the vertical standard at one side of the work-support, the arm pivotally mounted thereon adapted to extend over or away from the work-support, the work-clamp mounted on the arm and the pivoted link at the side of the support adapted to engage the free end of the arm.

6. In a vulcanizer, the combination with a steam-chamber constituting the work-support, the standard at the side thereof, the arm pivoted on the standard and adapted to be moved laterally over and away from the work-support, the clamping-screw on the arm, and the block with which said screw cooperates.

7. In a vulcanizer, the combination with the steam-chamber, constituting a work-support, the hollow standard communicating with the interior thereof, the arm swiveled on the standard, the clamping device on the arm, the collar on the standard for securing the arm, and the adjustable valve at the upper end of the standard.

8. In a vulcanizer, the combination with the base, the boiler 3 having the convex exterior and the hemispherical concave bottom 4, of the steam-chamber 9 attached to the upper portion of the boiler having the shaped upper face, and clamping devices mounted on the steam-chamber embodying a shaped clamping-block, substantially as described.

9. In a vulcanizer, the combination with the boiler 3 having the convex exterior and the hemispherical concave bottom 4, the inclined threaded nipple $4^\times$ on the boiler, the glass 6 and the flanged nut 5 on the nipple, substantially as described.

BERNARD REIN.

Witnesses:
F. F. CHURCH,
GEO. RICH.